No. 736,204. PATENTED AUG. 11, 1903.
M. BUCHNER.
REDUCTION OF NITRO AND AZO COMPOUNDS.
APPLICATION FILED SEPT. 24, 1900.
NO MODEL.
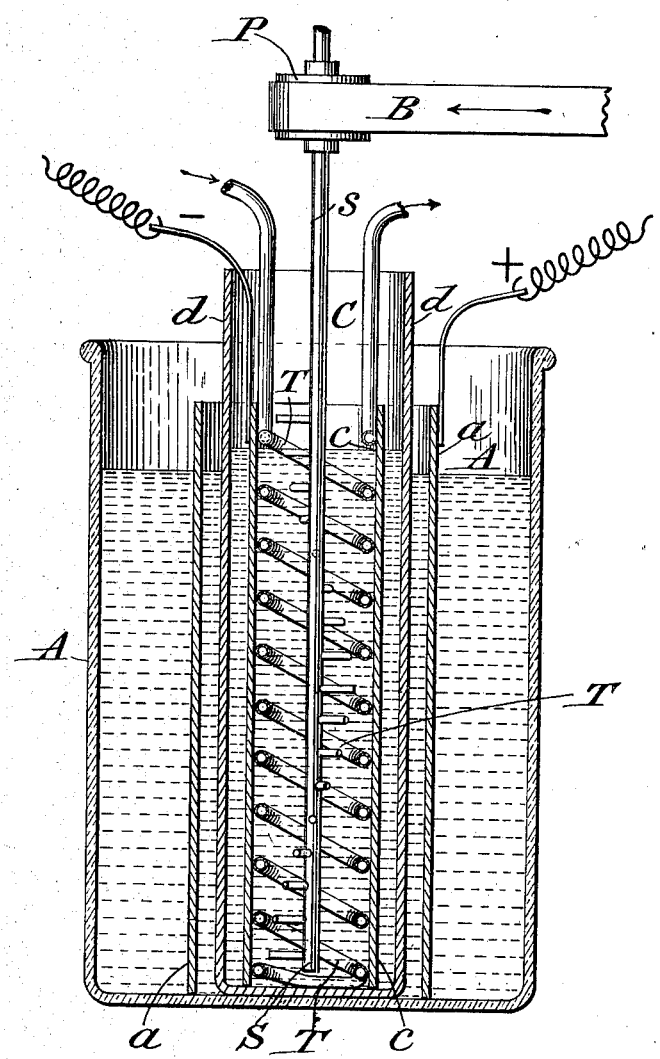

No. 736,204. Patented August 11, 1903.

UNITED STATES PATENT OFFICE.

MAX BUCHNER, OF MANNHEIM, GERMANY, ASSIGNOR TO C. F. BOEHRINGER & SOEHNE, OF MANNHEIM-WALDHOF, BADEN, GERMANY, A FIRM.

REDUCTION OF NITRO AND AZO COMPOUNDS.

SPECIFICATION forming part of Letters Patent No. 736,204, dated August 11, 1903.

Application filed September 24, 1900. Serial No. 30,967. (No specimens.)

*To all whom it may concern:*

Be it known that I, MAX BUCHNER, a citizen of the Empire of Germany, residing at Mannheim, in the Empire of Germany, have invented certain new and useful Improvements in Reduction of Nitro and Azo Compounds; and I do hereby declare the following to be a full, clear, and exact description of the invention, such as will enable others skilled in the art to which it appertains to make and use the same.

This invention relates to the reduction of nitro and azo compounds, and particularly to such reduction in connection with the employment of tin as a reducing agent, the purpose of my invention being to recover the tin in a metallic state by economic methods and with a minimum of waste. Metallic tin can only be employed for such reductions in a commercially successful manner if the same can be directly recovered from the reducing-bath, so that a comparatively small quantity of the same can be used over and over again in the reduction of comparatively large quantities of the starting materials. Hitherto a simple method of such direct recovery has been wanting. The chemical methods of recovering tin from the solutions of its salts cannot be employed in the arts because too expensive, and they are, moreover, objectionable for sanitary reasons. Although a convenient method of precipitation is afforded by electrolysis, such methods have hitherto been confined to the laboratory in cases where it was desired to recover quantitatively small amounts of tin, such recovery involving the exercise of the most developed skill of the analyst and a great waste of current. The only method having any importance in the arts hitherto devised is the electrolytic recovery of tin from tin scrap, which consists in employing such scrap as the anode in an alkaline electrolyte, whereby the metallic tin is deposited or separated on the cathode. Under this method, however, as well as when employing acid solutions, only low-current densities can be utilized, and a considerable amount of the current energy goes to waste, as abundantly confirmed in the literature of this art. The state of facts above adverted to have hitherto been made the use of this very valuable metal for the chemical reduction of nitro and azo compounds comparatively expensive, although its use for this purpose is exceedingly desirable. As a result of my researches and experiments in this field I have found that tin may be precipitated even from strong acid solutions of tin in hydrochloric acid remaining after the reduction of nitro or azo compounds and in the presence of high-current densities if the reducing process is so conducted that the tin employed is converted only into stannous chlorid and exists in solution as such together with the resultant amins, while, on the one hand, in the electrolysis of solutions of stannic chlorid the current energy is almost completely utilized in regenerating the lower chlorid of tin, about twenty per cent. of the work of the current being lost. In the recovery of tin from solutions of stannous chlorid, on the contrary, there is, as I have discovered, no loss of current energy. It is to be noted, moreover, that the double salts of stannic chlorid and the amins are, as a rule, much less soluble than the stannous chlorid salts. Hence the former are generally precipitated from the reducing solution, so that they must be diluted with considerable quantities of water to be put into condition for electrolysis. Such dilution manifestly leads to a waste of energy by reason of the increase of resistance to the current.

In carrying out my invention the reduction is always carried out by adding to the electrolyte of hydrochloric acid a quantity of tin sufficient to insure the formation of stannous chlorid only instead of stannic chlorid and to leave an excess of tin. After the completion of the reducing process the tin is precipitated from the acid solution by passing a current having a density of eighteen hundred amperes through the same. No electrolytic liberation of hydrogen takes place, so that no current energy is wasted. After such separation of tin the electrolytic bath contains only the pure chlorids of the resultant amins, which may be crystallized out of the solution by well-known methods in those cases where it is not preferred to employ the solutions directly.

I will now describe my invention more in detail with the aid of the following example, disclosing what I consider the preferred method of carrying the same into effect.

*Reduction of para-amido-azo-benzol-chlorid.*—2.334 kilograms amido-azo-benzol-chlorid are intimately mixed with 2.66 kilograms of electrolytically-precipitated powdered tin. Five kilograms water are then added and the whole is well mixed, whereupon 4.5 liters of fuming hydrochloric acid are gradually added. After the reduction due to this mixture has been completed the reduction bath or solution is maintained in a heated condition for several hours and then allowed to cool. After cooling the same is drained from the tin which exists in excess. The reduction solution is then poured into the cathode-space of an electrolytic cell whose anode-space is separated from the said cathode-space by a diaphragm. Any indifferent metal may serve as cathode and any indifferent conductor will answer as anode. The current employed for precipitation has a current density of about eighteen hundred amperes; but toward the close of the operation, when the concentration of the tin ions decreases considerably, it is advantageous and preferable to reduce this current density. In this manner 2.50 kilograms of the tin in the form of beautiful oblong crystalline scales or fine plates are recovered from the 2.66 kilograms originally employed. This form of tin is very well adapted to the reduction of nitro and azo compounds and much more soluble than the ordinary granular tin, for example. The mother-liquor remaining after the recovery of the tin may then be saturated with hydrochloric-acid gas in the cold, whereby the chlorid of para-phenyl-diamin is precipitated.

In the accompanying drawing I have represented one out of the many possible forms of apparatus and electrolytic cells for carrying out the process involved in my invention.

In the drawing, A represents the anode-chamber, containing the anode-electrolyte, and *a* the anode; C, the cathode-chamber, containing the cathode-electrolyte, and *c* the cathode, while *d* represents a diaphragm of any suitable material for the separation of the two electrolytes according to the usual manner.

S represents a suitable stirrer arranged within the cathode-electrolyte, the spindle or shaft *s* of which may be connected with any suitable source of power by a belt and pulley B P, as shown, or in any preferred way.

The cooling of the cathode-compartment may be effected by a cooling-coil T, arranged within the said cathode-compartment, as shown, said coil serving for the circulation of any cooling fluid, such as cold water.

What I claim, and desire to secure by Letters Patent of the United States, is—

1. The continuous process of reducing azo compounds which consists in mixing such compounds with tin and hydrochloric acid in such proportions that stannous chlorid is formed, and then electrolytically separating the tin from the bath.

2. The continuous process of reducing azo and nitro compounds which consists in mixing such compounds with finely-divided tin and water, then adding fuming hydrochloric acid in such proportions that only stannous chlorid is formed, and then electrolytically separating the tin from the bath.

3. The continuous process of reducing azo and nitro compounds which consists in mixing such compounds with finely-divided tin and water, then adding fuming hydrochloric acid in such proportions that only stannous chlorid is formed, then maintaining the whole at an elevated temperature for several hours, then cooling, and, finally, draining the solution from the excess of tin and separating the tin from the bath by electrolysis.

4. The continuous process of reducing azo compounds which consists in mixing such compounds with tin and hydrochloric acid in such proportions that stannous chlorid is formed, and then separating the tin from the stannous chlorid by an electric current of high density.

5. The continuous process of reducing azo and nitro compounds which consists in mixing such compounds with finely-divided tin and water, then adding fuming hydrochloric acid in such proportions that only stannous chlorid is formed, and then separating the tin from the stannous chlorid by an electric current of high density.

6. The continuous process of reducing azo and nitro compounds which consists in mixing such compounds with finely-divided tin and water, then adding fuming hydrochloric acid in such proportions that only stannous chlorid is formed, then maintaining the whole at an elevated temperature for several hours, then cooling then draining the solution from the excess of tin, and then separating the tin from the stannous chlorid by an electric current of high density.

7. The continuous process of reducing azo and nitro compounds which consists in mixing such compounds with tin and hydrochloric acid in such proportions that stannous chlorid is formed, then subjecting this reduction-bath in the cathode-space of an electrolytic cell to the action of an electric current of high density through the same, whereby the tin is precipitated from the bath, and then employing the tin thus recovered to repeat the above process.

8. The continuous process of reducing azo and nitro compounds which consists in mixing such compounds with finely-divided tin and water, then adding fuming hydrochloric acid in such proportions that only stannous chlorid is formed, then maintaining the whole at an elevated temperature for several hours, cooling and finally draining the solution from the excess of tin, then pouring the solution into the cathode-space of an electrolytic cell and passing an electric current of high density through the same, and then employing the tin thus recovered to repeat the above process.

In testimony whereof I affix my signature in presence of two witnesses.

MAX BUCHNER.

Witnesses:
JACOB ADRIAN,
FRITZ ACH.